United States Patent
Fujino et al.

(10) Patent No.: US 6,428,766 B1
(45) Date of Patent: Aug. 6, 2002

(54) MANGANESE OXIDE, LITHIUM MANGANESE COMPLEX OXIDE AND COBALT-COATED LITHIUM MANGANESE COMPLEX OXIDE, AND PREPARATION PROCESSES THEREOF

(75) Inventors: Shoichi Fujino; Hiroshi Takahama; Mitsuaki Hatatani; Norimiki Sugiyama; Hideaki Sadamura, all of Yamaguchi-ken (JP)

(73) Assignee: Toda Kogyo Corporation, Hiroshima (JP)

( * ) Notice: Subject to any disclaimer, the term of this patent is extended or adjusted under 35 U.S.C. 154(b) by 0 days.

(21) Appl. No.: 09/422,859

(22) Filed: Oct. 25, 1999

(30) Foreign Application Priority Data

Oct. 27, 1998 (JP) ............................ 10-305321
Dec. 10, 1998 (JP) ............................ 10-351021

(51) Int. Cl.⁷ ........................... C01G 45/12; H01M 4/50
(52) U.S. Cl. ....................... 423/599; 429/224
(58) Field of Search ................ 423/599, 605, 423/641, 635, 179.5; 429/224, 231.6, 231.95

(56) References Cited

U.S. PATENT DOCUMENTS

| | | | | |
|---|---|---|---|---|
| 5,198,081 A | * | 3/1993 | Kanoh et al. ............ 204/105 R |
| 5,449,577 A | * | 9/1995 | Dahn et al. .................... 429/94 |
| 5,478,672 A | * | 12/1995 | Mitate ......................... 429/194 |
| 5,807,646 A | * | 9/1998 | Iwata et al. ................. 429/224 |
| 5,866,279 A | * | 2/1999 | Wada et al. ................ 429/224 |
| 5,869,208 A | * | 2/1999 | Miyasaka .................... 429/224 |
| 5,874,058 A | * | 2/1999 | Sheargold et al. .......... 423/599 |
| 5,948,565 A | * | 9/1999 | Kelder ........................ 429/224 |
| 5,961,950 A | * | 10/1999 | Dahn et al. ................. 423/599 |
| 6,110,442 A | * | 8/2000 | Xia et al. .................... 423/599 |
| 6,117,410 A | * | 9/2000 | Ogihara et al. ............. 423/599 |
| 6,123,911 A | * | 9/2000 | Yamaguchi et al. ........ 423/599 |
| 6,168,888 B1 | * | 1/2001 | Iwata et al. ............ 429/231.95 |

\* cited by examiner

Primary Examiner—Steven P. Griffin
Assistant Examiner—Cam N. Nguyen
(74) Attorney, Agent, or Firm—Armstrong, Westerman & Hattori, LLP

(57) ABSTRACT

A manganese oxide which has a calcium or/and magnesium content of 0.01 to 2.50 mol % based on the moles of manganese, a lithium manganese complex oxide using the manganese oxide, and a cobalt-coated lithium manganese complex oxide are disclosed. These provide a particularly high discharge capacity and are useful for the improvement of cycle characteristics of a secondary battery as an active material of a positive electrode for a secondary battery with a nonaqueous electrolyte.

4 Claims, 6 Drawing Sheets

MANGANESE OXIDE, LITHIUM MANGANESE COMPLEX OXIDE AND COBALT-COATED LITHIUM MANGANESE COMPLEX OXIDE, AND PREPARATION PROCESSES THEREOF

BACKGROUND OF THE INVENTION

1. Field of the Invention

The present invention relates to a manganese oxide and process for preparing the oxide, a lithium manganese complex oxide using the manganese oxide and process for preparing the complex oxide, and further to a cobalt-coated lithium manganese complex oxide and process for preparing the cobalt-coated complex oxide. More specifically, the present invention relates to a manganese oxide giving a lithium manganese complex oxide, and a lithium manganese complex oxide using the manganese oxide and to a cobalt-coated lithium manganese complex oxide, which provide a particularly high discharge capacity and are useful for the improvement of cycle characteristics of a secondary battery as an active material of a positive electrode for a secondary battery with a nonaqueous electrolyte.

2. Description of the Prior Art

In recent years, there has been a rapid shift to portable and cordless types of electronic apparatus such as an AV device and a personal computer. Accordingly, there is an increasing demand for a secondary battery characterized by being small-sized and lightweight and having a high energy density. For the foregoing reason, a lithium-ion secondary battery is drawing attentions because this battery has a particularly high charge and discharge voltage and large charge and discharge capacity.

Heretofore, generally known as materials for a positive electrode useful in a high-energy lithium-ion secondary battery of a 4V grade are, for example, spinel-structured $LiMn_2O_4$ as well as rock salt-structured $LiMnO_2$, $LiCoO_2$, $LiCo_{1-x}Ni_xO_2$, and $LiNiO_2$. Among these substances, $LiCoO_2$ is advantageous in terms of a high voltage and high capacity. However, $LiCoO_2$ is disadvantageous in terms of high production cost due to the scanty supply of cobalt-containing raw materials and the problem associated with the safety of environments by waste batteries made of $LiCoO_2$. Therefore, intensive studies are being made about a spinel-structured lithium manganese complex compound ($LiMn_2O_4$) which is produced from manganese available in copious amounts at a lower cost and environment-friendly.

A problem with a system using $LiMn_2O_4$ as a material for a positive electrode of a lithium-ion secondary battery, however, is that this system is inferior in charging discharging cycle characteristics despite a high voltage and a high energy density that are obtainable. Presumably, direct causes of the problem are that the deintercalation and intercalation of lithium ions in the crystal structure brought about by the repetition of charging and discharging operations expands and contracts the crystal lattice to destroy it by a change in crystal volume, and that Mn dissolves in the electrolyte.

The following three types of techniques are exemplified as main means employed in prior art for developing materials which prevents the charge discharge capacity from being degraded due to the repetition of charging and discharging operations to thereby improve charging discharging cycle characteristics.

(a) Homogenization of Composition in a Lithium Manganese Complex Oxide

The techniques of this type are, for example, those described in Japanese Patent Laid-Open Publication (Kokai) Nos. 9-86,933, 9-306,493, 9-129,233, 9-259,863, 10-3,194, 8-217,451, 9-147,859, 9-124,321, 10-21,914, 9-180,723, 9-306,490, 9-50,811, 10-83,816, 10-172,568, 10-162,826, 10-172,569, 10-501,369, 7-101,727, 8-315,823, 4-198,028, 7-97,216, 8-217,452, 6-295,724, 10-81,520, 10-81,521, 9-147,867, 10-130,024, 10-130,025, 9-147,859, 10-162,826, and 10-265,224.

(b) Stabilization of Skeletal Structure of a Base by the Addition of Elements

The techniques of this type are, for example, those described in Japanese Patent Laid-Open Publication (Kokai) Nos. 9-147,867, 9-134,723, 9-270,259, 9-213,333, 10-40, 911, 10-3,918, 10-21,910, 10-172,568, 8-217,451, 8-217, 452, 2-60,056, 10-241,682, 10-241,685, 10-241,686, 10-241,687, Japanese Patent Nos. 2,584,123, 2,584,246, and 2,627,314, A. D. Robertson et al., J. Electrochem. Soc., 144 (1997) 3500, A. D. Robertson et al., J. Electrochem. Soc., 144 (1997) 3505, J. M. Tarascon et al., J. Electrochem. Soc., 138 (1991) 2859, Japanese Patent Laid-Open Publication (Kokai) Nos. 9-259,863, 9-265, 984, 10-116,603, 10-188, 953, 5-283,077, and 10-177,860.

(c) Inhibition of the Dissolution of Manganese by Surface Modification

The techniques of this type are, for example, those described in Japanese Patent Laid-Open Publication (Kokai) Nos. 10-3,194, 10-116,615, 10-199,528, WO97/23,918, and G. G. Amatucci et al., Solid State Ionics, 104(1997) 13.

In the case of type (a) described above, Japanese Patent Laid-Open Publication (Kokai) Nos. 9-86,933, 4-198,028 and 7-97,216 report an attempt to adjust the kind, shape, and size of precursors, while Japanese Patent Laid-Open Publication (Kokai) No. 6-295,724 reports an attempt to enhance the reactivity with lithium by employing mechanical pulverization and classification from the standpoint of carrying out homogeneous blending. On the other hand, Japanese Patent Laid-Open Publication (Kokai) No. 9-147,859 discloses the preparation of $LiMn_2O_4$ by using a technique such as a sol-gel process or spray drying. However, none of these techniques are satisfactory because of problems such as technical limitations and industrial problems.

In the case of type (b) described above, an element having a valency of 3 or less is found to be effective in the improvement of cycle characteristics. This technique, however, cannot be a substantial solution because a remarkable reduction in battery capacity is unavoidable due to the decrease of the amount of $Mn^{3+}$ which determines the battery capacity as an important characteristic of a secondary battery.

Furthermore, in the case of type (c) described above, for example, WO97/23,918 discloses a process comprising coating a manganese compound as a precursor of a lithium manganese complex oxide or a lithium manganese complex oxide with a non-manganese metal element, blending the coated product with a lithium salt, thereafter, sintering the resultant blend. Because of this process, it is difficult to consider that the non-manganese metal element sufficiently covers the surface of the lithium manganese complex oxide. In addition, since the non-manganese metal element on the surface also becomes a lithium compound, substances which have different electrochemical characteristics may be formed at the time of charging and discharging operations. Consequently, the battery characteristics are liable to become poor.

SUMMARY OF THE INVENTION

It is an object of the present invention to provide a secondary battery with a non-aqueous electrolyte, which is characterized by the realization of a high-level balance between charge-discharge capacity and cycle characteristics without using techniques of prior arts such as substitution of Mn or Li with other elements or surface treatment, by using as the active material of a positive electrode a spinel-structured lithium manganese oxide obtained by preparing a manganese oxide having a very good particle size distribution and using the obtained manganese oxide as the precursor.

Another object of the present invention is to provide a cobalt-coated lithium manganese complex oxide useful as the active material of a positive electrode for a secondary battery with a non-aqueous electrolyte, which secondary battery is characterized by the realization of a high-level balance between charge-discharge capacity and cycle characteristics, by preparing the cobalt-coated lithium manganese complex oxide by epitaxially growing a cobalt oxide on the surface of a lithium manganese oxide so that a predetermined-coating amount of cobalt is obtained.

Still further objects of the present invention will become apparent to those skilled in the art from the following detailed description.

DETAILED DESCRIPTION OF THE INVENTION

Figure 1:
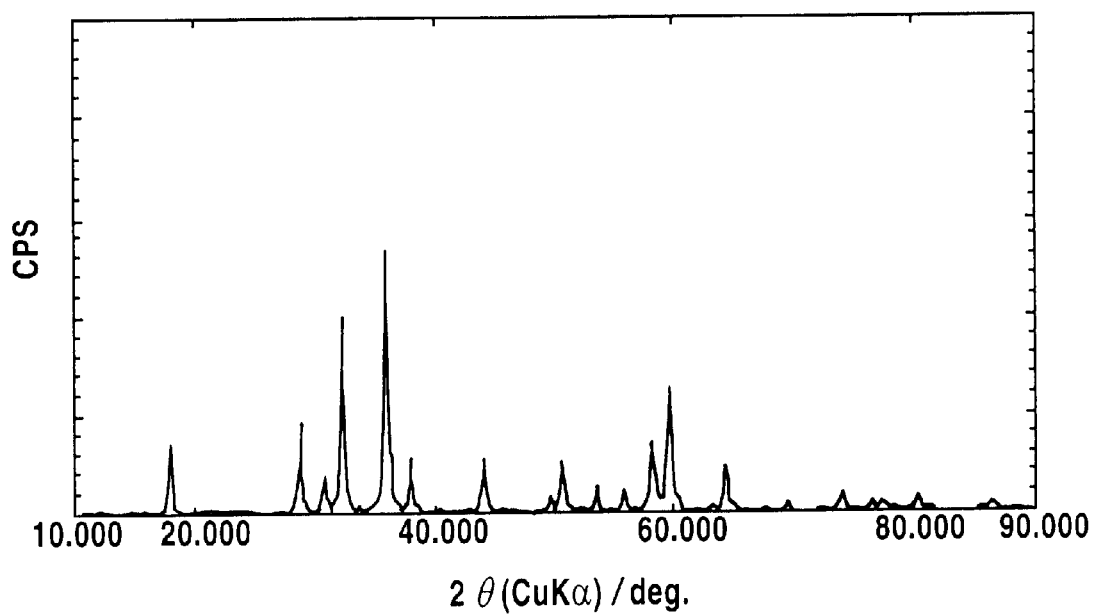
FIG. 1 is a graph showing an X-ray diffraction pattern of the manganese oxide prepared in Example 1.

The present invention is, in a first aspect, to provide a manganese oxide which has a calcium or/and magnesium content of 0.01 to 2.50 mol % based on the moles of manganese.

The present invention is, in a second aspect, to provide a process for preparing the manganese oxide, comprising the steps of:

adding to an aqueous manganese salt solution, a calcium salt or/and magnesium salt such that the calcium or/and magnesium content based on the moles of manganese is 0.01 to 2.50 mol % and an aqueous alkali solution at an alkali equivalent ratio of between 0.1 and 10 based on the total of the manganese and the calcium or/and magnesium to obtain an aqueous suspension of manganese (II) hydroxide, supplying an oxygen-containing gas into the aqueous suspension heated to a temperature of 20 to 100° C. to produce a precipitate by the oxidation of the manganese ions, and collecting the precipitate after filtration, washing with water and drying.

The present invention is, in a third aspect, to provide a lithium manganese complex oxide using the above-described manganese oxide as a precursor.

The present invention is, in a fourth aspect, to provide a process for preparing the lithium manganese complex oxide, which comprises the steps of:

mixing the above-described manganese oxide with a lithium compound such that the molar ratio of lithium to manganese (Li/Mn) is 0.505 to 0.550, compression molding the mixture to obtain a formed body, sintering the formed body in an oxidizing atmosphere, and pulverizing the sintered body.

The present invention is, in a fifth aspect, to provide a cobalt-coated lithium manganese complex oxide, wherein the coated amount of cobalt (Z wt %) in relation to a BET specific surface area (S $m^2/g$) of the lithium manganese complex oxide is within the range expressed by the following equation (1):

$$0.05 \times S \leq Z \leq 1.50 \times S \tag{1}$$

The present invention is, in a sixth aspect, to provide a process for preparing the above-described cobalt-coated lithium manganese complex oxide, comprising the steps of:

oxidizing lithium manganese complex oxide particles dispersed in an aqueous alkali solution and a cobalt compound at a temperature of 20 to 100° C. so that a cobalt oxide epitaxially grows on the lithium magnesium complex oxide, and collecting the resulting oxide after filtration, washing with water and drying.

One of the most effective measures to improve the cycle characteristics described earlier in the explanation of a prior art technique is to use as the active material of a positive electrode a substance which is represented by the chemical formula: $Li[Li_xMn^{3+}_{1-3x}Mn^{4+}_{1+2x}]O_4$ produced by the introduction of an excess of lithium into a 16d site. As can be predicted from the chemical formula, it is well known that, although increase in the amount of Li (x) to be introduced improves the cycle characteristics, the discharge capacity drops due to accompanying increase of the average valency of Mn (i.e., decrease of $Mn^{3+}$). In order to elucidate a basic cause leading to the above-mentioned deterioration of battery characteristics, the present inventors directed their attention to the phenomenon that, even if the values of initial charge capacity of samples produced by an ordinary solid-phase process were the same, the values of initial discharge capacity differed in the test of charging discharging characteristics. And, they ascribed the following mechanism to the above-described phenomenon.

If the precursor particles constituting the units of reaction have a broad particle size distribution, the amounts of Li (x) have a distribution or differ locally for each primary particle (when viewed microscopically) or particle of the lithium manganese complex oxide. That is, one portion has a smaller value of x and accordingly has a higher discharge capacity but poor cycle characteristics, whereas the other portion has a larger value of x and accordingly has a lower discharge capacity but better cycle characteristics. The formation of the portion having a smaller value of x can be explained as follows. Even if the deintercalation of lithium of crystals is once complete at an initial charge, the structure of the portion having a smaller value of x (i.e., a composition close to $LiMn_2O_4$) after completion of charging is so unstable and collapsible that the relationship, i.e., the deintercalation amount of lithium=the intercalation amount of lithium, is not established at the time of discharging when lithium is intercalated and that the initial discharge capacity is lower relative to the initial charge capacity. The problem of non-uniformity in the values of x for each primary particle or particle of the lithium manganese complex oxide can be ascribed to the manufacturing process of the lithium manganese complex oxide and particularly to the solid phase reaction between the precursor (mainly a manganese oxide) and a lithium salt at the time of sintering. Particularly, when less reactive coarser particles and more reactive finer particles are present together, the homogenization of composition cannot be attained and therefore the above-mentioned problem becomes remarkable.

From the foregoing viewpoint, the present inventors tried to improve the level of homogeneity (homogenization of the composition) inside each primary particle and between particles of the lithium manganese complex oxide by highly upgrading the particle size distribution of the manganese oxide itself as the precursor. As a result, they have achieved the above-described first to-fourth aspects of the present invention.

The dissolution of manganese from the active material is also thought to be a cause for the deterioration of the cycle characteristics of charge and discharge capacity, in addition to the above-described disorder of crystals due to repetition of charging and discharging operations. For this reason, as a measure to strengthen the M—O bond energy, substitution of Mn with such elements as Cr, Co, Ni or the like, has been studied. However, none of these measures can provide a substantial solution because of a remarkable drop in the battery capacity.

After intensive studies about the improvement of the cycle characteristics, the present inventors have found out that coating the lithium manganese complex oxide with a cobalt oxide, which is a chemically stable substance having a lattice constant close to that of the lithium manganese complex oxide, makes it possible to remarkably improve the cycle characteristics without causing a serious reduction of the battery capacity. The fifth and sixth aspects of the present invention are based on the above-described findings.

Although the mechanism of the improvement of the cycle characteristics has not yet been fully made clear, the following explanation is possible. As to the expansion and contraction of an octahedral structure, the lattice constant of $Li_{1+x}Mn_{2-x}O_4$ as a crystal prior to charging and the lattice constant of $\lambda MnO_2$ as a crystal after charging were studied. The lattice constant of the former is 8.15 to 8.24 Å, while the lattice constant of the latter is about 8.0 Å. On the other hand, the lattice constant of the cobalt oxide crystal as a coated material is 8.10±0.05 Å. Although this value varies depending on the composition or conditions of synthesis, it lies midway between the lattice constant of the lithium manganese complex oxide as a base crystal and the lattice constant of $\lambda MnO_2$ as a crystal after completion of charging. Therefore, when the octahedral crystal is expanded or contracted by the repetition of charging and discharging operations, the cobalt oxide serves as a kind of spring (this effect is hereinafter referred to as a spring effect) so as to alleviate crystal disorder.

In this case, if the coated crystal has the same spinel structure as that of the base crystal, a continuous crystal growth is possible. Therefore, it is preferable to coat a spinel structured cobalt oxide uniformly on the lithium manganese complex oxide constituting an internal base crystal. Since cobalt ions occupy 8a and 16d positions while oxygen ions occupy 32e positions in the spinel structure, 16c positions constituting a pathway for the lithium ions is in a state of vacant lattice. In this sense, the cobalt oxide is preferably of a spinel structure also from the standpoint that it provides the 16c positions serving as a deintercalation and intercalation pathway for the lithium ions. Moreover, the cobalt oxide is also preferred from the chemical stability.

The fact that cobalt oxide crystals grow on the surface of the lithium manganese complex oxide particles can be confirmed by referring to H. Sadamura, K. Yamashita, N. Nagai, J. Appl. Phys. 73(1933) 6731. That is, if a substance having a spinel structure is chemically coated (maintaining a crystalline continuity) with a substance having a spinel structure but a different lattice constant (different composition), the lattice constant of the resulting product is approximately equal to the volume arithmetic mean of the lattice constants of the two substances. If the two substances are merely mixed together, the data of X-ray diffraction analysis will correspond to respective lattice constants. The cobalt-coated lithium manganese complex oxides according to the present invention satisfy the above-described conditions sufficient to support that the surface of the lithium manganese complex oxide particles constituting base crystals is coated with cobalt oxide in such a manner that crystalline continuity is maintained.

Hereinafter, the first to fourth aspects of the present invention will be explained below.

The manganese oxide, which is used as a precursor of the lithium manganese complex oxide and has a particle size distribution remarkably improved, can be obtained by the addition of any one or both of calcium and magnesium at the time when the manganese oxide is synthesized.

That is, the manganese oxide, which has a particle size distribution remarkably improved, can be obtained by first preparing an-aqueous suspension of manganese (II) hydroxide either by adding to an aqueous manganese salt solution a calcium salt or a magnesium salt or both of these salts such that the calcium or/and magnesium content based on the moles of manganese is 0.01 to 2.50 mol % and subsequently adding to the mixture an aqueous alkali solution at an alkali equivalent ratio between 0.1 and 10 to the total of the manganese and the calcium or/and magnesium, or adding an aqueous calcium salt solution or an aqueous magnesium salt solution or both of these solutions in the above-described amounts to a mixture of an aqueous manganese solution and an aqueous alkali solution at the above-described equivalent ratio, thereafter supplying an oxygen-containing gas into the suspension heated to a temperature of 20 to 100° C. to produce a precipitate by the oxidation of the manganese ions, and collecting the precipitate after filtration, washing with water and drying.

Examples of the manganese salt usable in the present invention may include manganese sulfate, manganese nitrate, manganese oxalate, and manganese acetate. These may be used alone or in combination of two or more, as necessary. Although the concentration of the aqueous manganese salt solution is not particularly limited, a concentration of about 0.5 to 3.0 moles/liter is preferred from an industrial aspect.

For the purpose of improving the particle size distribution, a calcium salt or a magnesium salt or otherwise both of them are added. The amounts added are such that the moles of the calcium or the magnesium or the both are in the range of from 0.01 to 2.50 mol % based on the moles of the manganese. If the amount added is greater than 2.50 mol %, a peak indicating a phase other than a spine phase appears in an X-ray diffraction pattern and accordingly the particle size distribution becomes inferior. On the other hand, if the amount added is less than 0.01 mol %, the improving effect cannot be observed. Meanwhile, although the kinds of the magnesium salt and the calcium salt are not particularly limited, they are preferably soluble in water. Examples of the salts may include calcium nitrate, calcium acetate, calcium sulfate, magnesium sulfate, manganese nitrate, and manganese acetate. These may be used alone or in combination of two or more, as necessary. Although these salts may be used in a state of powder, they are added preferably as aqueous solutions. The concentration of the aqueous solution is not particularly limited.

The reaction equivalent ratio of the alkali to the manganese and the calcium or/and the magnesium is preferably in the range of from 0.1 to 10 and more preferably in the range of from 1.0 to 5.0 from standpoints including an industrial aspect. The kind of the alkali is not particularly limited, and examples of the alkali may include sodium hydroxide, potassium hydroxide, sodium carbonate, and potassium carbonate. These may be used alone or in combination of two or more, as necessary. Although the concentration of the aqueous alkali solution is not particularly limited, a concentration of about 5.0 to 18.0 moles/liter is preferred also from an industrial aspect.

A reaction temperature below 20° C. is difficult to control in a large-scale production process. On the other hand, a reaction temperature above 100° C. requires the use of an apparatus such as an autoclave and therefore leads to an increase in costs. Therefore, the reaction temperature is preferably in the range of from 20 to 100° C.

According to the above-described procedure, a spinel-structured manganese oxide, which has particle size distribution remarkably improved and whose calcium or/and magnesium content based on the moles of manganese is 0.01 to 2.50 mol %, can be obtained. Preferably, the manganese oxide thus obtained has a BET specific surface area in the range of from 1 to 100 m²/g and a particle size distribution of not greater than 0.4.

Next, the preparation of a lithium manganese complex oxide will be explained.

The spinel-structured lithium manganese complex oxide is obtained by a process comprising the steps of mixing the powder of the spinel-structured manganese oxide with a lithium compound such that the lithium to manganese molar ratio (Li/Mn) is 0.505 to 0.550, compression molding the mixture, and sintering the mixture in an oxygen-containing gas, preferably in air, at a temperature in the range of from 650 to 850° C.

The kind of the lithium compound for use in the present invention is not particularly limited, and examples of the lithium compound may include lithium hydroxide, lithium oxide, lithium carbonate, and lithium acetate. These may be used alone or in combination of two or more, as necessary.

The mixing ratio of the lithium compound to the manganese oxide needs to be in the above-mentioned range. If the amount of lithium is less than the above-mentioned range, the product contains, besides the lithium manganese complex oxide, a manganese oxide as the starting material which is not the active material of a positive electrode and which is very difficult to remove. Therefore, if the positive electrode is prepared by using the powder containing this manganese oxide, it is difficult to obtain good battery characteristics, i.e., electrochemical activity in an electrolyte having an electrical conductivity based on lithium ions. On the other hand, if the amount of lithium exceeds the above-mentioned range, the product contains, besides the lithium manganese complex oxide, a substance which is not the active material of a positive electrode such as lithium carbonate or $Li_2MnO_3$ and which is also very difficult to remove. Therefore, if the positive electrode is prepared by using the powder containing a substance such as the above-mentioned lithium carbonate or $Li_2MnO_3$, it is similarly difficult to obtain good battery characteristics or electrochemical activity.

The mixture of the manganese oxide and the lithium compound is then compression molded. That is, the mixture is compression molded by an extruder, a roller compactor, a disk pelleter, or the like, so as to prepare a formed body having a density of 1.5 g/cc or more and preferably 2 to 5 g/cc. In this operation, a small amount of water may be added in order to obtain a lithium maganese complex oxide having a stable quality by avoiding nonuniformity in density of the formed body. The amount of water added is 1 to 30% by weight, preferably 10 to 25% by weight, based on the mixture.

If a formed body having a density of less than 1.5 g/cc is sintered, the growth of the lithium manganese complex oxide grains is so unsatisfactory that the packing degree of a coated film produced from the complex oxide is insufficient. Although no upper limit of the density is specified in particular, the upper limit of the density is ordinarily 5 g/cc and preferably about 3 g/cc, because the preparation of a formed body having a very large density is difficult.

The sintering temperature is preferably in the range of from 650 to 850° C. This is because it is difficult to obtain a spinel-structured oxide at a temperature below 650° C. or above 850° C. due to the formation of $Li_2MnO_3$ or preferential oxidation of manganese. The sintering time is ordinarily 2 to 20 hours and preferably 5 to 10 hours.

The formed body after sintering operation is pulverized to prepare a powder of a spinel-structured lithium manganese complex oxide ($LiMn_2O_4$). The pulverizing method is not particularly limited and a conventional pulverizing method can be used.

In the case where the lithium manganese complex oxide of the present invention is used as an active material of a positive electrode for a secondary battery with a nonaqueous electrolyte, an active material of a negative electrode is not particularly limited. A substance, which can occlude and release lithium metal, a lithium alloy and lithium, can be used as the active material of a negative electrode. Examples of the substance may include a lithium-aluminum alloy, a lithium-tin alloy, and graphite.

The electrolyte is not particularly limited, either. For example, the electrolyte can be prepared by dissolving at least one lithium salt, which is selected from lithium perchlorate, lithium tetrafluoroborate, lithium hexafluorophosphate, and the like, in at least one organic solvent selected from carbonates such as propylene carbonate, diethyl carbonate, and dimethyl carbonate and ethers such as dimethoxyethane.

Next, the fifth and sixth aspects of the present invention will be explained.

The cobalt-coated lithium manganese complex oxide of the present invention is characterized in that the coated amount of cobalt (Z % by weight) in relation to a BET specific surface area (S m²/g) of the lithium manganese complex oxide is within the range specified by the following equation (1):

$$0.05 \times S \leq Z \leq 1.50 \times S \quad (1)$$

If the coated amount of cobalt is greater than 1.50×S % by weight, the overall capacity decreases because the proportion of the layer of cobalt oxide crystals, which grow on the surface of the particles of lithium manganese complex oxide and do not contribute to the charge and discharge capacity, becomes too large. On the other hand, if the coated amount of cobalt is smaller than 0.05×S % by weight, the sufficient-.effect cannot be obtained because the layer of cobalt oxide crystals is too thin or because a portion of the surface of the particles of lithium manganese complex oxide remains uncovered.

The cobalt-coated lithium manganese complex oxide can be prepared, for example, by a process comprising the steps of performing an oxidation reaction between particles of lithium manganese complex oxide dispersed in an aqueous alkali solution and a cobalt compound at a temperature in the range of from 20 to 100° C. so that an cobalt oxide grows epitaxially on the lithium manganese complex oxide, and collecting the resultant precipitate by filtration, washing with water and drying.

More specifically, the process comprises the steps of well dispersing the powder of lithium manganese complex oxide in an alkali solution, adding a cobalt compound to the dispersion, subjecting the dispersion to an oxidation reaction at a temperature in the range of from 20 to 100° C. so that an cobalt oxide grows epitaxially on the lithium manganese complex oxide, and collecting the resultant precipitate by filtration, purification and drying.

The lattice constant of the lithium manganese complex oxide for use in the present invention is preferably 8.15 to 8.24 Å. If the lattice constant is less than 8.15 Å, the amount of lithium in 16$d$ position significantly increases and accordingly the amount of $Mn^{3+}$ remarkably decreases. As a result, the battery capacity is undesirably decreased. On the other hand, if the lattice constant is greater than 8.24 Å, the discrepancy thereof from the lattice constant of the cobalt oxide crystals coated is so large that the spring effect of the cobalt oxide crystals on the surface undesirably diminishes. Further, as necessary, the lithium manganese complex oxide may contain one or two elements selected from Ca, Mg, Al, Fe, Ni, and the like.

Although the cobalt compound for use in the present invention is not particularly limited, it is preferably soluble in water. Examples of the cobalt compound may include cobalt acetate, cobalt sulfate, and cobalt chloride. These may be used alone or in combination of two or more, as necessary. Although these salts may be added in the form of powder, they are added preferably in the form of aqueous solution. The concentration of the solution is not particularly limited.

As described above, the amount of the cobalt compound to be used for coating depends on the BET specific surface area (S m²/g) of the lithium manganese complex oxide, and the coated amount is within the range of from 0.05×S to 1.50×S % by weight.

The concentration of the aqueous alkali solution is a concentration more than enough to neutralize the cobalt salt, and the concentration of the alkali ions is preferably in the range of from 0.01 to 10 moles/liter and more preferably in the range of from 0.5 to 5.0 moles/liter when an industrial aspect is also taken into consideration. The kind of the alkali is not particularly limited, and examples of the alkali may include sodium hydroxide, potassium hydroxide, sodium carbonate, potassium carbonate, lithium hydroxide, and lithium carbonate. These may be used alone or in combination of two or more, as necessary.

A reaction temperature below 20° C. leads to an increase in cost, because an additional equipment for cooling is necessary. On the other hand, a reaction temperature above 100° C. requires the use of an apparatus such as an autoclave and therefore leads to an increase in cost. Accordingly, the reaction temperature is preferably within the range of from 20 to 100° C.

As described above, a spinel-structured cobalt-coated lithium manganese complex oxide, whose cobalt content is within the range of from 0.05×S to 1.50×S % by weight, is obtained.

In the case where the cobalt-coated lithium manganese complex oxide of the present invention is used as an active material of a positive electrode with a nonaqueous electrolyte, an active material of a negative electrode is not particularly limited. A substance, which can occlude and release lithium metal, a lithium alloy, and lithium, can be used as the active material of a negative electrode. Examples of the substance may include a lithium-aluminum alloy, a lithium-tin alloy, and graphite.

The electrolyte is not particularly limited, either. For example, the electrolyte can be prepared by dissolving at least one lithium salt, which is selected from lithium perchlorate, lithium tetrafluoroborate, lithium hexafluorophosphate and the like, in at least one organic solvent selected from carbonates such as propylene carbonate, diethyl carbonate and dimethyl carbonate, and ethers such as dimethoxyethane.

The present invention will be explained in more detail by way of examples, but the present invention is in no way limited thereto.

The identification and examination of the crystal structures of reaction product powders were conducted by X-ray diffraction (RIGAKU, CuKα, 40 kv, 40 mA). The particle shape and the particle size distribution of precursors were observed by a transmission electron microscope (manufactured by Hitachi Ltd.). The BET specific surface area was measured by a nitrogen adsorption method. Further, based on the TEM photographs, average particle diameters and standard deviations were measured by using a digitizer, and particle size distributions were obtained by the following equation:

Particle size distribution=standard deviation/average particle diameter.

Furthermore, the coated amount of cobalt was determined by ICP (inductively coupled plasma) emission spectrometry.

EXAMPLE 1

An aqueous manganese (II) hydroxide suspension was obtained by adding sodium hydroxide at an equivalent ratio of 1.05 to a mixture of an aqueous magnesium sulfate solution (concentration of the solution: 1.48 moles/liter) which had been added with an aqueous calcium nitrate solution in an amount corresponding to 0.5 mol % of the moles of manganese (concentration of the solution: 0.012 mole/liter) and with an aqueous magnesium sulfate solution in an amount corresponding to 0.2 mol % of the moles of manganese (concentration of the solution: 0.0048 mole/liter). The aqueous suspension thus obtained was heated to 40° C. At the same time, air was supplied at a rate of 5 liters/minute to the suspension to oxidize the manganese ions to produce a manganese oxide. The manganese oxide was collected by filtration, washed with water, and drying. In this way, a blackish brown powder was obtained.

Figure 2:
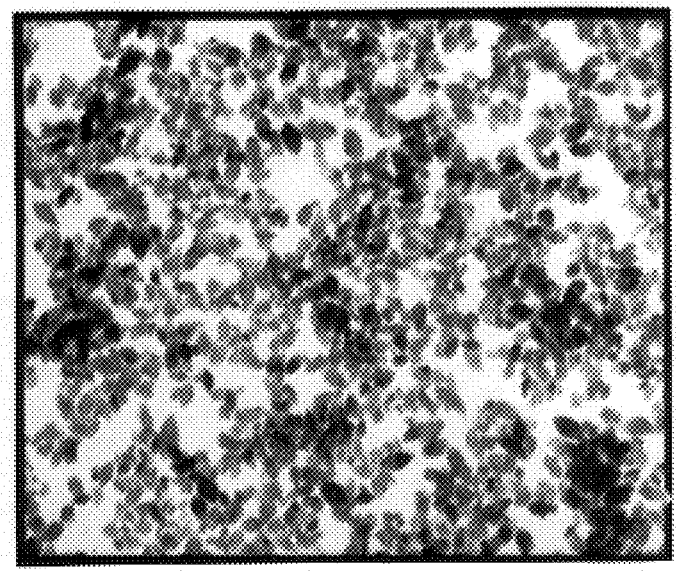
FIG. 2 is a TEM photograph (at a magnification of 60000) of the manganese oxide (BET specific surface area=55 $m^2/g$) prepared in Example 1.

The structure of the manganese oxide obtained belonged to a spinel crystal structure as indicated by the X-ray diffraction pattern of FIG. 1. The manganese oxide powder had a BET specific surface area of 55 m²/g and a particle size distribution of 0.29 as measured by a digitizer. FIG. 2 shows a TEM photograph of this manganese oxide.

EXAMPLE 2

A manganese oxide was prepared in the same manner as in Example 1, except that the reaction temperature was changed from 40° C. to 60° C.

EXAMPLE 3

Figure 3:
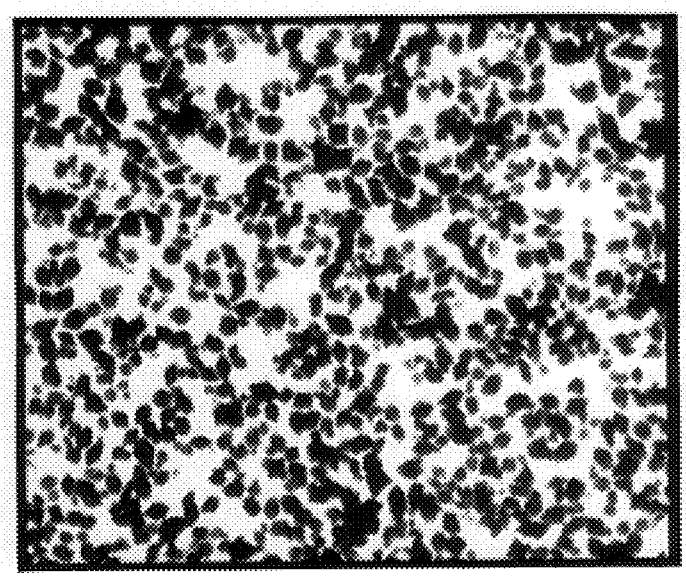
FIG. 3 is a TEM photograph (at a magnification of 10000) of the manganese oxide (BET specific surface area=7 $m^2/g$) prepared in Example 3.

A manganese oxide was prepared in the same manner as in Example 2, except that the reaction equivalent ratio of sodium hydroxide was changed from 1.05 to 5.0. FIG. 3 shows a TEM photograph of this manganese oxide.

EXAMPLE 4

A manganese oxide was prepared in the same manner as in Example 2, except that only an aqueous calcium nitrate solution in an amount corresponding to 1.5 mol % of the moles of manganese was added to the aqueous manganese sulfate solution.

EXAMPLE 5

A manganese oxide was prepared in the same manner as in Example 2, except that only an aqueous magnesium sulfate solution in an amount corresponding to 2.5 mol % of the moles of manganese was added to the aqueous manganese sulfate solution.

Comparative Example 1

A manganese oxide was prepared in the same manner as in Example 1, except that the aqueous manganese sulfate solution alone was used without the addition of the aqueous calcium nitrate solution and the aqueous magnesium sulfate solution.

Comparative Example 2

A manganese oxide was prepared in the same manner as in Comparative Example 1, except that the reaction temperature was changed from 40° C. to 60° C.

Comparative Example 3

A manganese oxide was prepared in the same manner as in Comparative Example 2, except that the reaction equivalent ratio of sodium hydroxide was changed from 1.05 to 5.0.

Comparative Example 4

A manganese oxide was prepared in the same manner as in Example 1, except that only an aqueous calcium nitrate solution in an amount corresponding to 6.0 mol % of the moles of manganese was added to the aqueous manganese sulfate solution.

Comparative Example 5

A manganese oxide was prepared in the same manner as in Example 1, except that an aqueous calcium nitrate solution in an amount corresponding to 3.0 mol % of the moles of manganese and an aqueous magnesium sulfate solution in an amount corresponding to 3.0 mol % of the moles of manganese were added to the aqueous manganese sulfate solution.

The preparation conditions and characteristics of the manganese oxides prepared in Examples 1 to 5 and in Comparative Examples 1 to 5 are shown in Table 1.

TABLE 1

| | Preparation conditions | | | | Reaction products | | | |
| --- | --- | --- | --- | --- | --- | --- | --- | --- |
| | Ca/Mn (mol %) | Mg/Mn (mol %) | Alkali (equivalent ratio) | Temperature (° C.) | Kinds | BET specific surface area (m²/g) | Diameter of the smallest particle (μm) | Particle size distribution (STD) |
| Example 1 | 0.40 | 0.20 | 1.05 | 40 | Spinel-structured Mn oxide | 55 | 0.03 | 0.29 |
| Example 2 | 0.40 | 0.19 | 1.05 | 60 | Spinel-structured Mn oxide | 33 | 0.05 | 0.31 |
| Example 3 | 0.39 | 0.20 | 5.0 | 60 | Spinel-structured Mn oxide | 7 | 0.15 | 0.32 |
| Example 4 | 0.65 | * 0.01 | 1.05 | 60 | Spinel-structured Mn oxide | 48 | 0.03 | 0.30 |
| Example 5 | * 0.02 | 2.37 | 1.05 | 60 | Spinel-structured Mn oxide | 32 | 0.04 | 0.38 |
| Comp. Ex. 1 | * 0.002 | * 0.005 | 1.05 | 40 | Spinel-structured Mn oxide | 30 | 0.05 | 0.45 |
| Comp. Ex. 2 | * 0.001 | * 0.004 | 1.05 | 60 | Spinel-structured Mn oxide | 17 | 0.05 | 0.71 |
| Comp. Ex. 3 | * 0.001 | * 0.005 | 5.0 | 60 | Spinel-structured Mn oxide | 2 | 0.25 | 0.80 |
| Comp. Ex. 4 | 4.21 | * 0.01 | 1.05 | 40 | Mixture of Mn oxides | 95 | — | — |
| Comp. Ex. 5 | 2.08 | 3.15 | 1.05 | 40 | Mixture of Mn oxides | 90 | — | — |

* Impurities contained in raw materials

As is apparent from Table 1, in Examples 1 to 5, it is possible to prepare spinel-structured manganese oxides having particle size distributions remarkably improved (i.e., particle size distributions of not greater than 0.4) irrespective of BET values by using predetermined amounts of a magnesium salt, a calcium salt or both of them in the synthesis reactions.

On the other hand, although manganese oxides of the same crystal-structure can be obtained in Comparative Examples 1 to 3, these manganese oxides have poor particle size distributions which exceed 0.4. Further, in Comparative Examples 4 and 5, peaks of plural manganese oxides (such as $Mn_3O_4$, $\beta$-MnOOH and the like) were observed in X-ray diffraction patterns.

In the following Examples 6 to 12 and Comparative Examples 6 to 11, these manganese oxides were used as precursors to prepare lithium manganese complex oxides for use as active materials of a positive electrode. Using the complex oxides as active materials, experimental batteries were fabricated and battery characteristics were evaluated.

EXAMPLE 6

Figure 4:
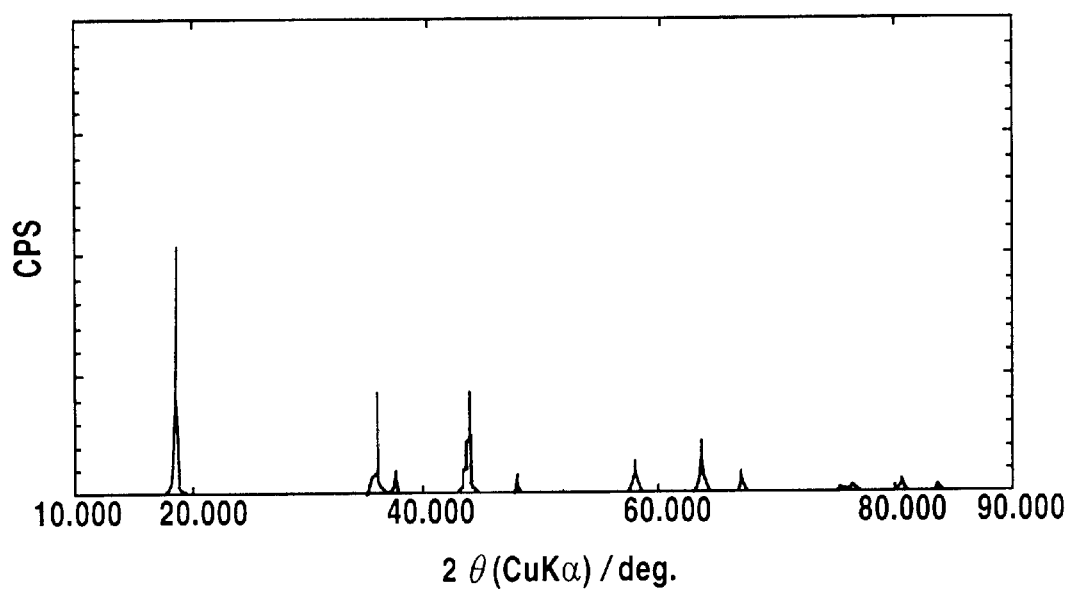
FIG. 4 is a graph showing an X-ray diffraction pattern of the lithium manganese complex oxide prepared in Example 6.

The manganese oxide powder prepared in Example 1 and lithium carbonate in predetermined amounts to obtain a molar ratio (Li/Mn) of 0.525 were mechanically mixed together. The mixture was compression molded by a roller compactor. The formed body was placed in an electric furnace, heated to 700° C., and thus reacted in air for 10 hours. The sintered product obtained was pulverized in a mortar to obtain a black powder. This powder was a good crystalline complex oxide ($LiMn_2O_4$) whose crystal structure belonged to a spinel crystal structure as indicated by the X-ray diffraction pattern of FIG. 4.

(Fabrication of a Battery)

A composition for a positive electrode was prepared by mixing in a mortar 45 mg of the lithium manganese complex oxide obtained above, 25 mg of acetylene black as an electrically conductive agent, and 7 mg of polytetrafluoroethylene as a binding agent. A lithium foil was used as a negative electrode. A 1M lithium perchlorate solution, which was obtained by dissolving lithium perchlorate in a solvent prepared by mixing propylene carbonate and dimethoxyethane at a volume ratio of 1:1, was used as an electrolyte.

(Evaluation)

By using the battery thus obtained, charging and discharging operations were repeated at a constant electric current of 0.5 $mA/cm^2$ and at a battery voltage between 3.0 to 4.5V.

Figure 5:
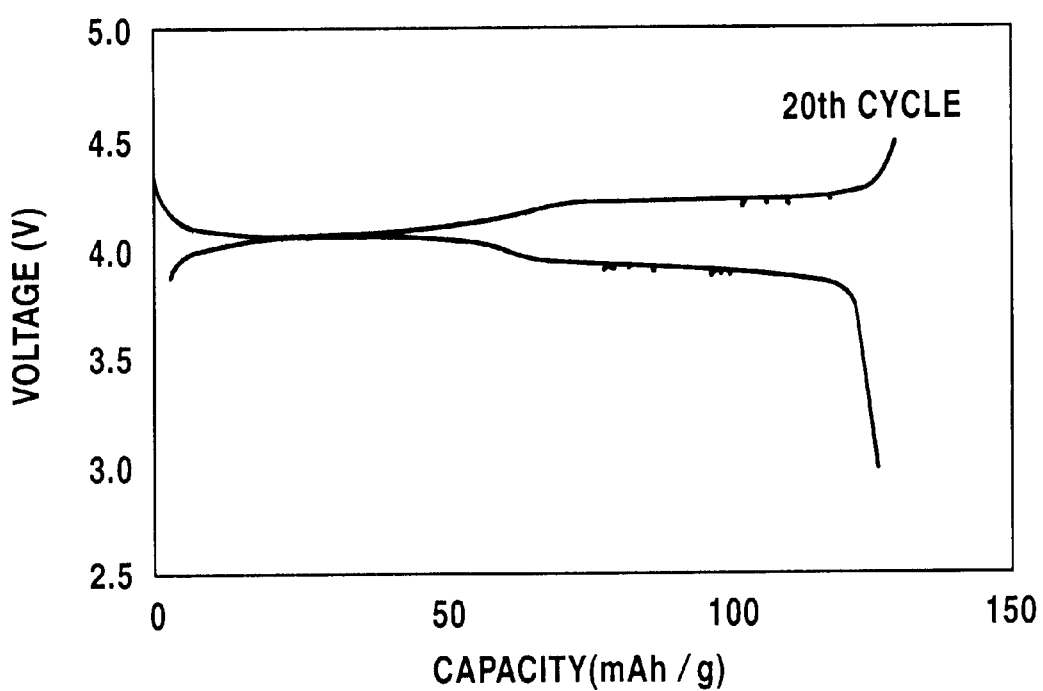
FIG. 5 is a graph showing the charging discharging curve at the 20th cycle of a secondary battery with a nonaqueous electrolyte using the lithium manganese complex oxide prepared in Example 6 as the active material of a positive electrode.

FIG. 5 shows a charging and discharging curve at the 20th cycle. The discharge capacity at the 20th cycle was 127 mAh/g, which indicated that 100% of the discharge capacity at the first cycle was maintained.

The evaluation of charging and discharging characteristics of the following examples and comparative examples was conducted in the same condition by using batteries having the same construction.

EXAMPLE 7

A lithium manganese complex oxide was prepared in the same manner as in Example 6, except that the molar ratio of manganese to lithium (Li/Mn) was changed from 0.525 to 0.505.

EXAMPLE 8

A lithium manganese complex oxide was prepared in the same manner as in Example 6, except that the sintering temperature was changed from 700° C. to 800° C.

EXAMPLE 9

A lithium manganese complex oxide was prepared in the same manner as in Example 6, except that the manganese oxide prepared in Example 2 was used.

EXAMPLE 10

A lithium manganese complex oxide was prepared in the same manner as in Example 6, except that the manganese oxide prepared in Example 3 was used.

EXAMPLE 11

A lithium manganese complex oxide was prepared in the same manner as in Example 6, except that the manganese oxide prepared in Example 4 was used.

EXAMPLE 12

A lithium manganese complex oxide was prepared in the same manner as in Example 6, except that the manganese oxide prepared in Example 5 was used.

Comparative Example 6

A lithium manganese complex oxide was prepared in the same manner as in Example 6, except that the manganese oxide prepared in Comparative Example 1 was used.

Comparative Example 7

A lithium manganese complex oxide was prepared in the same manner as in Example 6, except that the manganese oxide prepared in Comparative Example 2 was used.

Comparative Example 8

A lithium manganese complex oxide was prepared in the same manner as in Example 6, except that the manganese oxide prepared in Comparative Example 3 was used.

Comparative Example 9

A lithium manganese complex oxide was prepared in the same manner as in Example 6, except that the manganese oxide prepared in Comparative Example 4 was used.

Comparative Example 10

A lithium manganese complex oxide was prepared in the same manner as in Example 6, except that the manganese oxide prepared in Comparative Example 5 was used.

Comparative Example 11

A lithium manganese complex oxide was prepared in the same manner as in Example 6, except that calcium oxide in an amount corresponding to 1.5 mol % of the moles of manganese was added to the powder of the manganese oxide prepared as in Comparative Example 1.

Preparation conditions and characteristics of the lithium manganese complex oxides prepared in Examples 6 to 12 and in Comparative Examples 6 to 11 are shown in Table 2.

TABLE 2

| | | Preparation conditions | | | | Reaction products | | |
|---|---|---|---|---|---|---|---|---|
| | Precursors (manganese oxides) | Li/Mn molar ratio | Density after compression molding (g/cc) | Sintering temperature (° C.) | | Kinds | Discharge capacity at 20th cycle (mAh/g) | Capacity maintenance rate at 20th cycle (%) |
| Example | | | | | | | | |
| 6 | Mn oxide of Example 1 | 0.525 | 2.14 | 700 | | Spinel-structured Li—Mn oxide | 127 | 100 |

TABLE 2-continued

| | | Preparation conditions | | | Reaction products | | |
|---|---|---|---|---|---|---|---|
| | Precursors (manganese oxides) | Li/Mn molar ratio | Density after compression molding (g/cc) | Sintering temperature (° C.) | Kinds | Discharge capacity at 20th cycle (mAh/g) | Capacity maintenance rate at 20th cycle (%) |
| 7 | Mn oxide of Example 1 | 0.505 | 1.96 | 700 | Spinel-structured Li—Mn oxide | 133 | 98 |
| 8 | Mn oxide of Example 1 | 0.525 | 2.02 | 800 | Spinel-structured Li—Mn oxide | 130 | 99 |
| 9 | Mn oxide of Example 2 | 0.525 | 2.31 | 700 | Spinel-structured Li—Mn oxide | 122 | 100 |
| 10 | Mn oxide of Example 3 | 0.525 | 1.98 | 700 | Spinel-structured Li—Mn oxide | 115 | 100 |
| 11 | Mn oxide of Example 4 | 0.525 | 2.00 | 700 | Spinel-structured Li—Mn oxide | 124 | 100 |
| 12 | Mn oxide of Example 5 | 0.525 | 1.92 | 700 | Spinel-structured Li—Mn oxide | 118 | 99 |
| Comparative Example | | | | | | | |
| 6 | Mn oxide of Comp. Ex. 1 | 0.525 | 1.97 | 700 | Spinel-structured Li—Mn oxide | 122 | 96 |
| 7 | Mn oxide of Comp. Ex. 2 | 0.525 | 1.86 | 700 | Spinel-structured Li—Mn oxide | 116 | 95 |
| 8 | Mn oxide of Comp. Ex. 3 | 0.525 | 2.05 | 700 | Spinel-structured Li—Mn oxide | 104 | 94 |
| 9 | Mn oxide of Comp. Ex. 4 | 0.525 | 2.15 | 700 | Spinel-structured Li—Mn oxide + Calcium oxide | 85 | 92 |
| 10 | Mn oxide of Comp. Ex. 5 | 0.525 | 2.03 | 700 | Spinel-structured Li—Mn oxide | 95 | 90 |
| 11 | Mn oxide of Example 1 + Calcium oxide | 0.525 | 1.95 | 700 | Spinel-structured Li—Mn oxide | 123 | 96 |

As is apparent from Table 2, all of Examples 6 to 12 provided good crystalline lithium manganese complex oxides each exhibiting a spinel-structured single phase. As to battery characteristics, the capacity maintenance rate after the 20th cycle was almost 100%, although initial discharge capacity varied depending on particle sizes and sintering conditions. This phenomenon can be explained as follows. In the sintering of a lithium compound and a manganese oxide at a high temperature, the relationship between the melting points makes the diffusion of lithium easier than the diffusion of a transition metal such as manganese. Therefore, the reaction presumably proceeds mainly by the diffusion of lithium into the particles of manganese oxide. Accordingly, the manganese oxide, which is used as a precursor and has a very good particle size distribution, enables the reaction to proceed uniformly at a primary particle level so that the composition of the reaction product is homogenized.

On the other hand, in the case of Comparative Examples 6 to 8, the capacity maintenance rate after the 20th cycle was inferior, although the X-ray diffraction patterns were the same and the initial discharge capacities were also nearly the same. In Comparative Examples 9 and 10, plural phases of X-ray diffraction patterns were observed and the lattice constants were extremely small. The battery characteristics of Comparative Examples 9 and 10 were also poor. The calcium content of Comparative Example 11 was within an acceptable range. However, the cycle characteristics of Comparative Example 11 were poor, because the particle size distribution of the precursor was not improved in the production process.

As can be seen from Tables 1 and 2, the present invention provides a manganese oxide having a superior particle size distribution. This manganese oxide can be used as a precursor of a lithium manganese complex oxide which is an active material of a positive electrode with a nonaqueous electrolyte. The lithium manganese complex oxide thus obtained has excellent homogeneity of composition even after a sintering reaction at a high temperature. As a result, it is possible to provide a secondary battery with a nonaqueous electrolyte in which a high-level balance between the charge-discharge capacity and cycle characteristics is realized without replacing Mn or Li with other elements or carrying out a surface treatment.

EXAMPLE 13

A manganese oxide having a specific surface area of 55 $m^2/g$ was used as a precursor (precursor a) and was blended with lithium carbonate such that the Li/Mn ratio was is 0.525. The mixture was sintered at 700° C. in air for 10 hours. The product was a lithium manganese complex oxide which exhibited a spinel-structured single phase having a lattice constant of 8.239 Å and a BET specific surface area of 11 $m^2/g$.

By using this lithium manganese complex oxide as a base crystal A, a cobalt-coating reaction was performed as in the following way. To 705 milliliters of a 1.5 moles/liter lithium hydroxide aqueous solution, 100 g of the lithium manganese complex oxide were added and was sufficiently dispersed while supplying nitrogen gas thereinto. The supplying of the nitrogen gas was continued until air was replaced with the nitrogen gas. Then, while the aqueous suspension was well stirred, 22 milliliters of a 1.3 moles/liter cobalt sulfate aqueous solution and 273 milliliters of distilled water were added, then the temperature of the aqueous suspension was raised to 90° C. When this temperature was reached, the nitrogen gas supply was ceased and the supplying of air at a rate of 1 liter/minute was started and continued for 3 hours while keeping the aqueous suspension at 90° C. Next, after cooling, the solid component was collected by filtration, washing with water and drying. In this way, a cobalt-coated lithium magnesium complex oxide was obtained.

Figure 6:
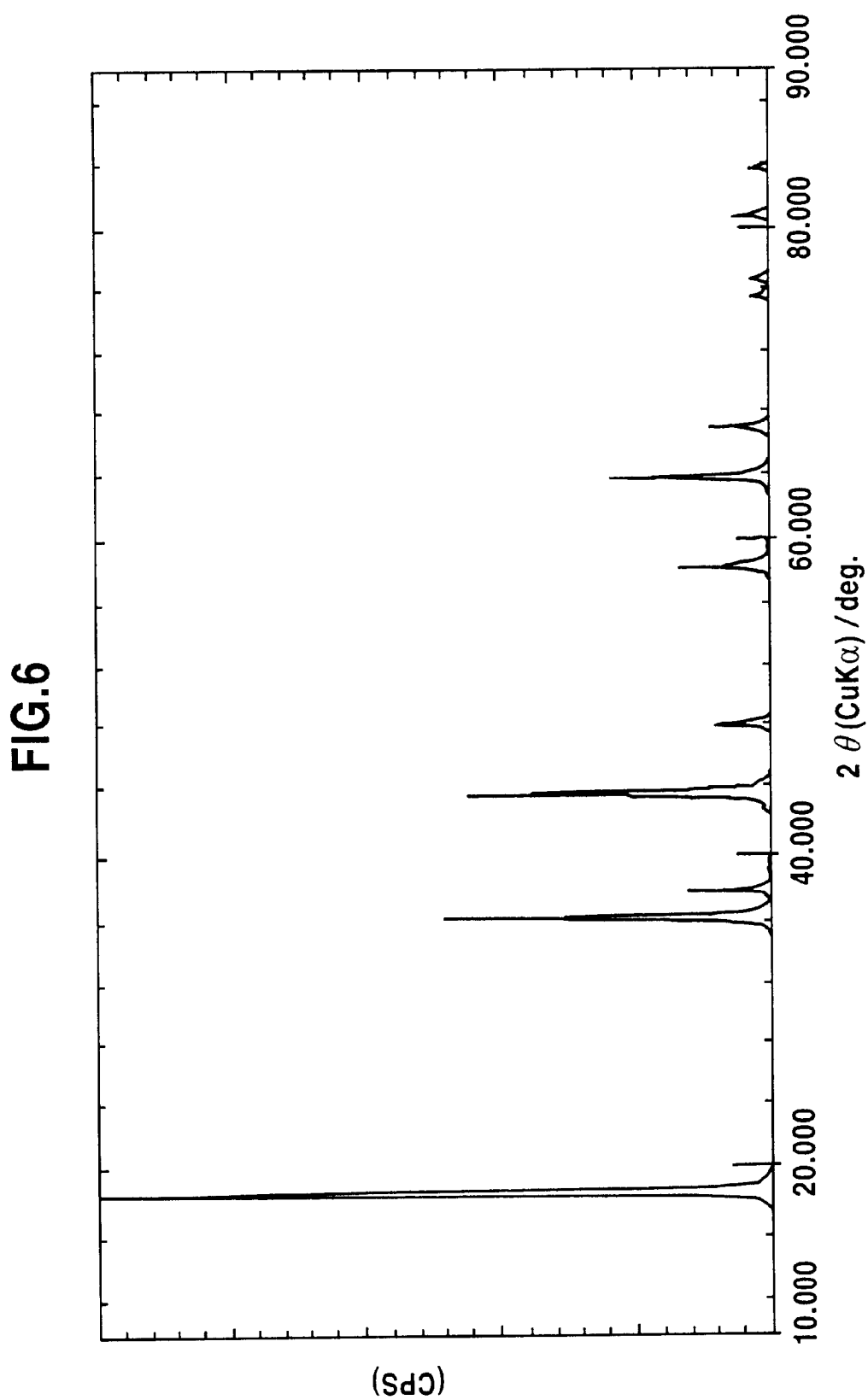
FIG. 6 is a graph showing an X-ray diffraction pattern of the cobalt-coated lithium manganese complex oxide prepared in Example 13.

The structure of the cobalt-coated manganese complex oxide obtained belonged to a spinel crystal structure as indicated by the X-ray diffraction pattern of FIG. 6. The lattice constant was 8.235 Å. The coated amount of cobalt was 1.65% by weight (corresponding to Z=0.15×S).

(Fabrication of a Battery)

A composition for positive electrode was prepared by mixing in a mortar 80 mg of the cobalt-coated lithium manganese complex oxide thus obtained, 15 mg of acetylene black as an electrically conductive agent, and 5 mg of polytetrafluoroethylene as a binding agent. A lithium foil was used as a negative electrode. A 1M lithium perchlorate solution, which was obtained by dissolving lithium perchlorate in a solvent prepared by mixing propylene carbonate and dimethoxyethane at a volume ratio of 1:1, was used as an electrolyte.

(Evaluation)

By using the battery thus obtained, charging and discharging operations were repeated at a constant electric current of 0.5 mA/cm$^2$ and at a battery voltage between 3.0 to 4.5V.

Figure 7:
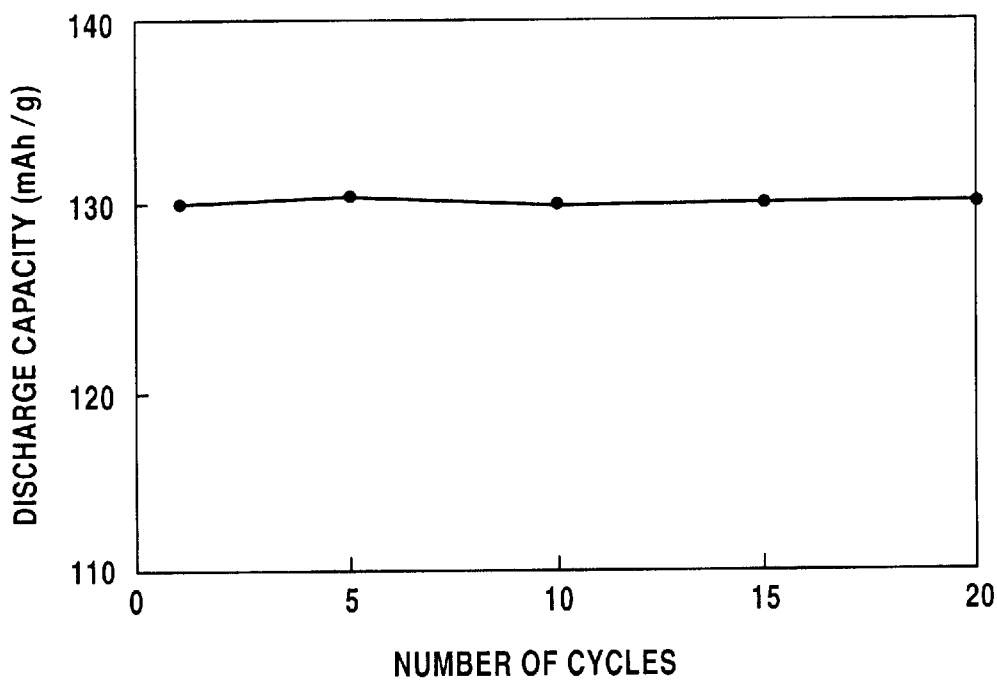
FIG. 7 is a graph showing the change in discharge capacity versus the number of cycles of the cobalt-coated lithium manganese complex oxide prepared in Example 13.
Figure 8:
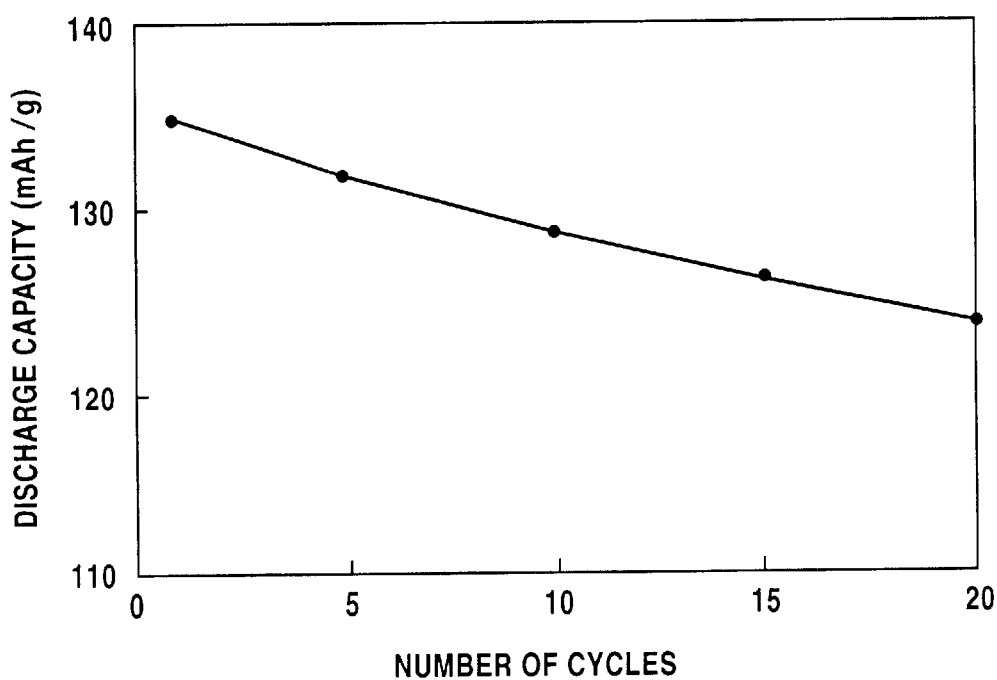
FIG. 8 is a graph showing the change in discharge capacity versus the number of cycles of the lithium manganese complex oxide used as the base crystal A in Example 13.

FIG. 7 shows changes in discharge capacity up to the 20th cycle. The discharge capacity at the first cycle was 130 mAh/g and the discharge capacity at the 20th cycle was 129 mAh/g, which indicated that 99% of the discharge capacity at the first cycle was maintained.

The evaluation of charging discharging characteristics of the following examples and comparative examples was conducted in the same condition by using batteries having the same construction.

EXAMPLE 14

A lithium manganese complex oxide (base crystal B) was prepared in the same manner as in Example 13, except that the Li/Mn ratio was 0.550. This complex oxide was a single-phase lithium manganese complex oxide having a lattice constant of 8.229 Å and a BET specific surface area of 10.5 m$^2$/g. With the exception that this lithium manganese complex oxide was used, the procedure of Example 13 was repeated. In this way, a cobalt-coated lithium manganese complex oxide, which had a coated amount of cobalt of 1.6% by weight and corresponded to Z=0.15×S, was prepared.

EXAMPLE 15

A lithium manganese complex oxide (base crystal C) was prepared in the same manner as in Example 13, except that the Li/Mn ratio was 0.600. This complex oxide was a single-phase lithium manganese complex oxide having a lattice constant of 8.213 Å and a BET specific surface area of 9.8 m$^2$/g. With the exception that this lithium manganese complex oxide was used, the procedure of Example 13 was repeated. In this way, a cobalt-coated lithium manganese complex oxide, which had a coated amount of cobalt of 1.7% by weight and corresponded to Z=0.17×S, was prepared.

EXAMPLE 16

A manganese oxide having a specific surface area of 7 m$^2$/g was used as a precursor (precursor b) and was blended with lithium carbonate such that the Li/Mn ratio was 0.575. The mixture was sintered at 700° C. in air for 10 hours. The product was a lithium manganese complex oxide which exhibited a spinel-structured single phase having a lattice constant of 8.230 Å and a BET specific surface area of 3.5 m$^2$/g. With the exception that this lithium manganese complex oxide was used as a base crystal D, the procedure of Example 13 was repeated. In this way, a cobalt-coated lithium manganese complex oxide, which had a coated amount of cobalt of 1.6% by weight and corresponded to Z=0.46×S, was prepared.

EXAMPLE 17

By using the base crystal A prepared in Example 13, a cobalt-coating reaction was performed in the following way. To 780 milliliters of a 1.5 moles/liter lithium hydroxide aqueous solution, 100 g of the lithium manganese complex oxide were added and it was sufficiently dispersed while supplying nitrogen gas thereinto. The supplying of the nitrogen gas was continued until air was replaced with the nitrogen gas. Then, while the aqueous suspension was well stirred, 65 milliliter s of a 1.3 moles/liter cobalt sulfate aqueous solution and 155 milliliters of distilled water were added. The temperature of the aqueous suspension was raised to 90° C. When this temperature was reached, the nitrogen gas supply was ceased and the supplying of air at a rate of 1 liter/minute was started and continued for 3 hours while keeping the aqueous suspension at 90° C. Next, after cooling, the solid component was collected after filtration, washing with water and drying. In this way, a cobalt-coated lithium manganese complex oxide, which had a coated amount of cobalt of 4.9% by weight and corresponded to Z=0.45×S, was prepared.

EXAMPLE 18

A cobalt-coated lithium manganese complex oxide, which had a coated amount of cobalt of 4.9% by weight and corresponded to Z=1.40×S, was prepared by repeating the procedure of Example 17, except that the base crystal D prepared in Example 16 was used.

Comparative Examples 12 to 15

In Comparative Examples 12 to 15, the base crystals A to D prepared in Examples 13 to 16 were used, respectively, to fabricate batteries and the battery characteristics were evaluated.

Comparative Example 16

A cobalt-containing manganese oxide having a cobalt content of 5% by weight and a specific surface area of 15 m$^2$/g was used as a precursor (precursor c). This manganese oxide was blended with lithium carbonate such that the Li/(Mn+Co) ratio was 0.525. The mixture was sintered at 700° C. in air for 10 hours. The product was a cobalt-containing lithium manganese complex oxide which exhibited a spinel-structured single phase having a lattice constant of 8.213 Å and a BET specific surface area of 7.5 m$^2$/g.

Comparative Example 17

The precursor a was coated with cobalt to thereby prepare a precursor d such that the coated amount of cobalt was 5% by weight according to the aforesaid process for coating a lithium manganese oxide with cobalt. This precursor d was blended with lithium carbonate such that the Li/(Mn+Co) ratio was 0.525. The mixture was sintered at 700° C. in air for 10 hours. The product was a cobalt-containing lithium manganese complex oxide which exhibited a spinel-structured single phase having a lattice constant of 8.215 Å and a BET specific surface area of 11.0 m$^2$/g.

Preparation conditions and characteristics of the lithium manganese complex oxides prepared in Examples 13 to 18 and in Comparative Examples 12 to 17 are shown in Table

TABLE 3

| | Pre-cursors Kinds | Kinds | Base crystals Amount of cobalt (wt %) | Lattice constant (Å) | BET specific surface area S (m²/g) | Reaction temperature (° C.) | Cobalt-treated samples Amount of cobalt Z (wt %) | Lattice constant (Å) | Remarks | Discharge capacity Initial (mAh/g) | At 20th cycle (mAh/g) | Capacity maintenance rate (%) |
|---|---|---|---|---|---|---|---|---|---|---|---|---|
| Example | | | | | | | | | | | | |
| 13 | a | A | 0.0 | 8.239 | 11.0 | 90 | 1.65 | 8.235 | — | 130 | 129 | 99 |
| 14 | a | B | 0.0 | 8.229 | 10.5 | 90 | 1.6 | 8.226 | — | 125 | 125 | 100 |
| 15 | a | C | 0.0 | 8.213 | 9.8 | 90 | 1.7 | 8.210 | — | 105 | 105 | 100 |
| 16 | b | D | 0.0 | 8.230 | 3.5 | 90 | 1.6 | 8.226 | — | 120 | 120 | 100 |
| 17 | a | A | 0.0 | 8.239 | 11.0 | 90 | 4.9 | 8.229 | — | 121 | 121 | 100 |
| 18 | b | D | 0.0 | 8.230 | 3.5 | 90 | 4.9 | 8.220 | — | 112 | 112 | 100 |
| Comparative Example | | | | | | | | | | | | |
| 12 | a | A | 0.0 | 8.239 | 11.0 | — | — | — | Base crystal of Example 1 | 135 | 124 | 92 |
| 13 | a | B | 0.0 | 8.229 | 10.5 | — | — | — | Base crystal of Example 2 | 129 | 121 | 94 |
| 14 | a | C | 0.0 | 8.213 | 9.8 | — | — | — | Base crystal of Example 3 | 110 | 108 | 98 |
| 15 | b | D | 0.0 | 8.230 | 3.5 | — | — | — | Base crystal of Example 4 | 125 | 119 | 95 |
| 16 | c | E | 4.9 | 8.213 | 7.5 | — | — | — | Co-doped precursor | 108 | 96 | 89 |
| 17 | d | F | 4.9 | 8.215 | 11.0 | — | — | — | Co-treated precursor | 110 | 97 | 88 |

As can be seen from Table 3, Examples 13 to 18 provide higher discharge capacities and better cycle stability.

On the other hand, Comparative Examples 12 to 15, which use base crystals of Examples 13 to 16, respectively, exhibit inferior cycle stability despite high initial capacities.

It can also be seen that, despite the fact that the cobalt content was the same as in Examples, the material in which cobalt was contained in precursor crystals (Comparative Example 16) and the material in which the precursor surface was coated with cobalt (Comparative Example 17) do not exhibit satisfactory characteristics in capacity and cycle stability.

Based on the above-described results, it can be understood that the mode in which cobalt is contained is very important for the cobalt-containing lithium manganese complex oxides. That is, a content of cobalt is not all that is required, and the cycle stability can be improved only if the cobalt is present on the surface of the particles of the lithium manganese complex oxide. This is presumably because, as described earlier, the cobalt oxide on the surface not only alleviates the expansion and contraction of the lithium manganese complex oxide at the time of charging discharging operations, but also prevents the manganese from being dissolved.

As can be seen from Table 3, the present invention provides a lithium manganese complex oxide having excellent durability and chemical stability which is improved in the expansion and contraction of crystals and the dissolution of manganese. The use of the lithium manganese complex oxide makes it possible to provide a secondary battery with a nonaqueous electrolyte in which a high-level balance between the charge-discharge capacity and cycle characteristics is realized.

What is claimed is:

1. A process for preparing a lithium manganese complex oxide, which comprises the steps of:

mixing a manganese oxide which has a calcium and/or magnesium content of 0.01 to 2.50 mol % based on the moles of manganese with a particle size distribution of not greater than 0.4 with a lithium compound such that the molar ratio of lithium to manganese (Li/Mn) is 0.505 to 0.550, compression molding the mixture to obtain a formed body, sintering the formed body in an oxidizing atmosphere, and pulverizing the sintered body.

2. The process for preparing the lithium manganese complex oxide of claim 1, wherein the density of the formed body after the compression molding is not less than 1.5 g/cc.

3. A process for preparing a lithium manganese complex oxide, which comprises the steps of:

mixing a manganese oxide which has a calcium and/or magnesium content of 0.01 to 2.50 mol % based on the moles of manganese, a BET specific surface area of 1 to 100 m²/g and a particle size distribution of not greater than 0.4 with a lithium compound such that the molar ratio of lithium to manganese (Li/Mn) is 0.505 to 0.550, compression molding the mixture to obtain a formed body, sintering the formed body in an oxidizing atmosphere, and pulverizing the sintered body.

4. The process for preparing the lithium manganese complex oxide of claim 3, wherein the density of the formed body after the compression molding is not less than 1.5 g/cc.

* * * * *